United States Patent Office
3,415,837
Patented Dec. 10, 1968

3,415,837
1,-DIHYDRO-NAPHTHALENE DERIVATIVES
William Laszlo Bencze, New Providence, and Charles Ferdinand Huebner, Chatham, N.J., assignors to Ciba Corporation, New York, N.Y., a corporation of Delaware
No Drawing. Continuation-in-part of application Ser. No. 222,621, Sept. 9, 1962. This application Apr. 1, 1964, Ser. No. 356,669
15 Claims. (Cl. 260—297)

This application is a continuation-in-part of our co-pending application Ser. No. 222,621, filed Sept. 9, 1962, now abandoned which in turn is a continuation-in-part of our application S.N. 160,291 filed Dec. 18, 1961 now abandoned.

The present invention relates to compounds of the formula

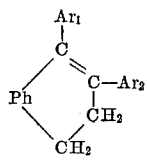

in which Ph stands for a 1,2-phenylene radical, one of the radicals $Ar_1$ and $Ar_2$ stands for (hydroxy)-phenyl or (lower alkoxy)-phenyl, and the other stands for phenyl, (lower alkyl)-phenyl, (hydroxy)-phenyl, lower alkoxy)-phenyl, (halogeno)-phenyl or pyridyl, and salts of compounds having salt-forming groups, as well as process for the preparation of such compounds.

The 1,2-phenylene (o-phenylene) radical is unsubstituted or may be substituted by one or more than one of the same or of different substituents attached to any of the four positions available for substitution. Substituents are primarily lower alkyl, e.g. methyl, ethyl, n-propyl, isopropyl and the like, hydroxyl, etherified hydroxyl, preferably lower alkoxy, e.g. methoxy, ethoxy, n-propyloxy, isopropyloxy, n-butyloxy and the like, as well as lower alkenyloxy, e.g. allyloxy and the like, or lower alkylenedioxy, e.g. methylenedioxy and the like, or esterified hydroxyl, preferably halogeno (representing hydroxyl esterified by a hydrohalic acid), e.g. fluoro, chloro, bromo and the like, as well as nitro, amino, N-substituted amino, such as N,N-di-lower alkyl-amino, e.g. N,N-dimethylamino, N,N-diethylamino and the like, trifluoromethyl, or any other suitable substituent. The 1,2-phenylene group Ph in the above formula stands above all for 1,2-phenylene, (lower alkyl)-1,2-phenylene, (hydroxy)-1,2-phenylene, (etherified hydroxy)-1,2-phenylene, preferably (lower alkoxy)-1,2-phenylene, as well as (lower alkenyloxy)-1,2-phenylene, (lower alkylenedioxy)-1,2-phenylene and the like, or (esterified hydroxy)-1,2-phenylene, preferably (halogeno)-1,2-phenylene and the like, as well as (nitro)-1,2-phenylene, (amino) - 1,2 - phenylene, (N - substituted amino)-1,2-phenylene, preferably (N,N-lower alkylamino)-1,2-phenylene, (trifluoromethyl)-1,2-phenylene or any other suitably substituted 1,2-phenylene group.

As mentioned above, one of the groups $Ar_1$ and $Ar_2$ stands for (hydroxy)-phenyl or (lower alkoxy)-phenyl having one or more than one hydroxyl group or lower alkoxy group, respectively, which may be attached to any of the positions available for substitution in the phenyl radical; preferably the 4-position is substituted by hydroxyl or lower alkoxy. The latter has preferably from one to four carbon atoms and stands above all for methoxy, as well as ethoxy, n-propyloxy, isopropyloxy, n-butyloxy, isobutyloxy and the like.

The other of the two groups $Ar_1$ and $Ar_2$ represents phenyl, (lower alkyl)-phenyl, (hydroxyl)-phenyl, (lower alkoxy)-phenyl, (halogeno)-phenyl or pyridyl; the substituted phenyl groups have one or more than one substituent, which has the previously given meaning, and is attached to any of the positions available for substitution.

The compounds of the invention having salt-forming groups may be present in the form of their salts. Metal salts are formed with compounds having a phenolic hydroxyl group, as present, for example, in a (hydroxy)-1,2-phenylene radical or a (hydroxy)-phenyl group; metal salts are particularly alkali metal salts, e.g. sodium, potassium and the like, salts or alkaline earth metal salts, e.g. magnesium, calcium and the like, salts. Compounds having a group with a basic nitrogen atom, such as a pyridyl, an (amino)-1,2-phenylene or an (N-substituted-amino)-1,2-phenylene group, form acid addition salts, such as pharmaceutically acceptable, non-toxic acid addition salts, especially with inorganic acids, e.g. hydrochloric, hydrobromic, sulfuric, phosphoric acids and the like, as well as with organic acids, susch as organic carboxylic acids, e.g. formic, acetic, pivalic, glycolic, lactic, malonic, succinic, maleic, malic, tartaric, citric, benzoic, salicyclic, 2-acetoxy-benzoic, nicotinic, isonicotinic acid and the like, or organic sulfonic acids, e.g. methane sulfonic, ethane sulfonic, ethane 1,2-disulfonic, 2-hydroxyethane sulfonic, p-toluene sulfonic, naphthalene 2-sulfonic acid and the like, or any other suitable acid. Other acid addition salts, such as those which may be prepared primarily for identification purposes, are, for example, addition salts with certain inorganic acids, e.g. perchloric acid and the like, with acidic organic nitro compounds, e.g. picric, picrolonic, flavianic acid and the like, metal complex acid, e.g. phosphotungstic, phosphomolybdic, chloroplatinic, Reinecke acid and the like, or any other suitable acid.

The compounds of this invention have estrogenic properties, and are useful as estrogenic agents, for example, in raising livestock for increased weight gain, increased efficiency of feed utilization and the like. Compounds of this invention also have a lowering effect on the cholesterol content in the blood serum, and can, therefore, be used as hypocholesterolemic agents.

Particularly useful are the compounds of the formula

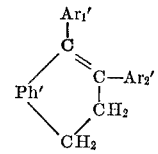

in which Ph' stands primarily for 1,2-phenylene, (lower alkyl)-1,2-phenylene, (hydroxy) - 1,2 - phenylene, (lower alkoxy)-1,2-phenylene or (halogeno)-1,2-phenylene, as well as (nitro)-1,2-phenylene, (amino)-1,2 - phenylene, (N,N-di-lower alkyl-amino)-1,2-phenylene or (trifluoromethyl)-1,2-phenylene, one of the groups $Ar_1'$ and $Ar_2'$ is (hydroxy)-phenyl, particularly 4-hydroxy-phenyl, or (lower alkoxy)-phenyl, particularly 4-lower alkoxy-phenyl and especially 4-methoxy-phenyl, and the other is phenyl, (lower alkyl)-phenyl, (hydroxy)-phenyl, (lower alkoxy)-phenyl, (halogeno)-phenyl or pyridyl.

The compounds of this invention are useful in the form of compositions for enteral or parenteral application, which contain the new compounds in admixture with a pharmaceutical organic or inorganic, solid or liquid carried, which usually represents the major portion of the composition. For making up the preparations there can be employed carriers used in the manufacture of pharmaceutical compositions, such as water, gelatine, lactose, glucose, wheat starch, corn starch, stearic acid, magnesium stearate, talc, vegetable oils, alcohol, benzyl alcohol, gums, acacia, propylene glycol, polyalkylene glycols or any other carrier used for such preparations. The latter may be in solid form, for example, as capsules, tablets, dragees and the like, or in liquid form, for example, as solutions, suspensions and the like. If necessary, these preparations may contain auxiliary substances, such as preserving, stabilizing, wetting, emulsifying, coloring, flavoring agents and the like, salts for varying the osmotic pressure, buffers, etc., and, in combination, other useful substances.

Compounds of this invention having the previously-given formula, in which at least one of the groups $Ar_1$ and $Ar_2$ is (hydroxy)-phenyl, are also useful as intermediates for the preparation of compounds having the following formula

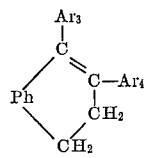

in which Ph has the previously-given meaning, and at least one of the groups $Ar_3$ and $Ar_4$ stands for a (tertiary amino-lower alkyloxy)-phenyl group, in which tertiary amino is separated from oxy by at least two carbon atoms, and the other represents phenyl, (lower alkyl)-phenyl, (lower alkoxy)-phenyl, (halogeno)-phenyl, pyridyl, or (tertiary amino-lower alkyl-oxy)-phenyl groups, in which tertiary amino is separated from oxy by at least two carbon atom salts, N-oxides, salts of N-oxides and quaternary ammonium compounds. These compounds, in which tertiary amino-lower alkyloxy has the following formula $Am-(C_nH_{2n})-O-$, in which the tertiary amino group Am (representing primarily N,N-di-lower alkyl-amino, N,N-alkylene-amino- in which alkylene has from four to seven carbon atoms, 4-morpholino, 4-lower alkyl--1-piperazino and the like) is separated from oxy by at least two, preferably by two to three, carbon atoms of a lower alkylene radical, have estrogenic effects and are, therefore, useful as estrogenic agents, for example, in raising livestock to increase weight, increase efficiency of feed utilization and the like; compounds of this type also have a lowering effect on the blood serum cholesterol, and are, therefore, useful as hypocholesterolemic agents. Furthermore, they also show effects against gram positive bacteria, such as *Diplococcus pneumoniae, Staphylococcus aureus* and the like, against fungi, such as *Trichophyton mentagrophytes, Trichophyton gallinae, Trichophyton interdigitale* and the like, or against yeasts, such as *Candida albicans* and the like, and are useful in the treatment of infections caused by such micro-organisms. These compounds are prepared according to known methods, for example, by forming an alkali metal salt of the compound containing at least one (hydroxy)-phenyl group, and reacting it with a reactive ester of a tertiary amino-lower alkanol, in which tertiary amino is separated from hydroxyl by at least two carbon atoms, particularly a tertiary amino-lower alkyl halide, e.g. chloride.

The compounds of this invention are prepared according to known methods, for example, by eliminating the elements of the compound of the formula R—OH from a compound having one of the formulae

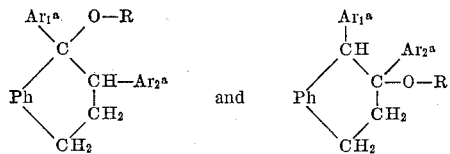

in which Ph has the previously given meaning, one of the groups $Ar_1^a$ and $Ar_2^a$ stands for phenyl substituted by $R_0^a$ capable of being converted into hydroxyl, and the other is phenyl substituted by $R_0^a$, phenyl, (lower alkyl)-phenyl, (halogeno)-phenyl, or pyridyl, and R stands for hydrogen or the acyl portion of an organic acid, and, if desired, converting in a resulting compound having a phenyl group substituted by $R_0^a$ capable of being converted into hydroxyl, the group $R_0^a$ into hydroxyl, and/or, if desired, converting in a resulting compound having a hydroxyl group, such group into lower alkoxy, and/or, if desired, introducing into the 1,2-phenylene radical a substituent, and/or, if desired, converting a substituent attached to the 1,2-phenylene radical into another substituent, and/or, if desired, converting a resulting salt into the free compound, and/or, of desired, converting a resulting compound having a salt-forming group into a salt thereof, and/or, if desired, converting a resulting mixture of isomeric compounds into the single isomers.

In the above starting materials, a group $R_0^a$ capable of being converted into hydroxyl is above all lower alkoxy, especially methoxy, as well as one of the previously-mentioned lower alkoxy groups, but may also be a benzyloxy group, such as benzyloxy, 1-phenyl-ethyloxy and the like, or a benzyloxy group, in which the carbocyclic aryl portion is substituted by suitable substituents, or any other group capable of being converted into a hydroxyl group.

The group R in the above starting material is primarily hydrogen, but may also be the acyl radical of an organic acid, such as an organic carboxylic acid, for example, a lower alkanoic acid, e.g. acetic, propionic acid and the like, as well as benzoic acid, or any other suitable organic carboxylic acid, or an organic sulfonic acid, e.g. p-toluene sulfonic acid and the like.

The removal of R—OH (i.e. water or an organic acid) from the starting material is carried out according to known methods. Water is removed by dehydration, for example, by heating, or more preferably, by treatment with a dehydrating reagent, especially an acidic dehydrating agent, such as an inorganic acid, e.g. hydrochloric, hydrobromic, hydriodic, sulfuric acid and the like, an inorganic acid halide, e.g. thionyl chloride, phosphorus chloride and the like, or any other suitable inorganic acid reagent, e.g. ammonium chloride and the like, as well as an organic acid, e.g. p-toluene sulfonic acid and the like, an organic acid halide, e.g. acetic acid chloride, p-toluene sulfonyl chloride and the like, or an organic acid anhydride, e.g. acetic acid anhydride, propionic acid anhydride and the like, or any other suitable organic acidic dehydrating reagent, e.g. pyridine hydrochloride and the like. If necessary, the reaction is carried out in the presence of a suitable diluent, preferably, at an elevated temperature, in a closed vessel, and/or, in the atmosphere of an inert gas, e.g. nitrogen.

The removal of an organic acid of the formula R—OH is carried out by heating, or again by treating with an acidic reagent, preferably at an elevated temperature. Removal of such acid may occur simultaneously with the conversion of a hydroxyl group into an acyl radical by esterification; for example, upon treatment of the starting material having a hydroxyl group with an esterifying reagent, such as an acid anhydride, e.g. acetic acid anhydride, propionic acid anhydride and the like, to form the ester, elimination of the elements of an acid may occur during the reaction.

In a resulting compound, in which one of the groups $Ar_1^a$ and $Ar_2^a$ is substituted by $R_0^a$ capable of being converted into hydroxyl, the group $R_0^a$ may be converted, in order to form the desired products, in which one of the groups $Ar_1$ and $Ar_2$ is substituted by hydroxyl. For example, lower alkoxy representing $R_0^a$ may be converted into hydroxyl by treatment of the resulting compound with a suitable acid reagent, such as a mineral acid, e.g. hydrobromic, hydriodic acid and the like (if desired, in the presence of an organic acid, e.g. glacial acetic acid and the like), a mineral acid addition salt of a weak organic base, e.g. pyridine hydrochloride and the like, or any other suitable acidic reagent. The reaction is preferably carried out at an elevated temperature, if necessary, in the presence of a diluent, in a closed vessel, and/or, in the atmosphere of an inert gas, e.g. nitrogen. On the other hand, a benzyloxy group representing $R_0$ is converted into hydroxyl by hydrogenolysis (for example, by treatment with hydrogen in the presence of a catalyst, e.g. a palladium catalyst and the like, preferably in the presence of a diluent, and, if necessary, under pressure).

In a resulting compound, a free hydroxyl group may be converted into lower alkoxy according to known methods, for example, by treatment with a lower diazoalkane, particularly diazo-methane, as well as diazoethane and the like, or by forming an alkali metal salt of the resulting compound having a phenolic hydroxyl group (for example, by treatment with an alkali metal hydride, an alkali metal amide, an alkali metal lower alkoxide and the like, preferably in the presence of an appropriate diluent), and reacting the resulting salt with a reactive ester of a lower alkanol, such as a lower alkyl halide, e.g. methyl, ethyl, n-propyl or isopropyl chloride, bromide or iodide and the like, a di-lower alkyl sulfate, e.g. dimethyl sulfate and the like, or any other suitable reagent.

The starting materials used in the above reaction are new and are intended to be included within the scope of this invention. Particularly useful are those having one of the formulae

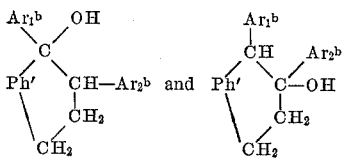

in which Ph' has the above-given meaning, one of the groups $Ar_1^b$ and $Ar_2^b$ stands for (lower alkoxy)-phenyl, particularly 4-lower alkoxy-phenyl and especially 4-methoxy-phenyl, and the other is phenyl, (lower alkyl)-phenyl, (lower alkoxy)-phenyl, (halogeno)-phenyl or pyridyl.

The above starting materials are prepared according to methods known per se, for example, by reacting a compound of the formula

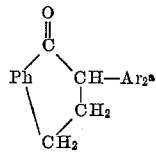

in which Ph and $Ar_2^a$ have the previously-given meaning, with a reagent of the formula $Ar_1^{a\ominus}M^\oplus$, in which $Ar_1^{a\ominus}$ has the previously-given meaning, and $M^\oplus$ stands for the positively charged ion of certain metals of the I-A Group of the Periodic System or, more particularly, for the positively charged ion of the formula Hal-Met$^\oplus$, in which Met stands for certain divalent metals of the II-A Group and the II-B Group of the Periodic System, and Hal is halogeno, or reacting a compound of the formula

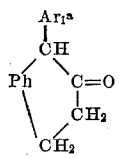

in which Ph and $Ar_1^a$ have the previously-given meaning, with a reagent of the formula $Ar_2^{a\ominus}M^\oplus$, in which $Ar_2^{a\ominus}$ and $M^\oplus$ have the previously-given meaning, and, if desired, converting in a resulting compound one of the formulae

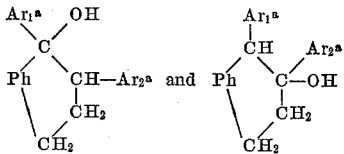

in which Ph, $Ar_1^a$ and $Ar_2^a$ have the previously-given meaning, the free hydroxyl group in an organic acyloxy group.

The ion $M^\oplus$ represents, for example, the positive ion of an alkali metal, such as sodium, or particularly lithium, or, more especially, the positive ion of a Grignard reagent, having the formula Hal-Mg$^\oplus$, in which Hal is halogeno, e.g. chloro, bromo, iodo and the like. Both types of reagents are used under similar conditions; preferably, the alkali metal compound or the Grignard reagent is prepared separately and is then reacted with the ketone starting material. The solvent used during the preparation of the reagent, especially the Grignard reagent, such as a di-lower alkyl ether, particularly diethyl ether, may be diluted or replaced by other solvents, for example, by another ether, such as a monocyclic carbocyclic aryl lower alkyl ether, e.g. anisole and the like, a bis-monocyclic carbocyclic aryl ether, e.g. diphenyl ether and the like, a cyclic ether, e.g. tetrahydrofuran, p-dioxane and the like, an organic base, e.g. pyridine, N-methylmorpholine and the like, a monocyclic carbocyclic aryl hydrocarbon, e.g. benzene, toluene, xylene and the like, an aliphatic hydrocarbon, e.g. pentane, and the like, or any other suitable solvent or solvent mixture. The reaction may be carried out while cooling, at room temperature or at an elevated temperature; if necessary, the atmosphere of an inert gas, e.g. nitrogen, may be required, particularly when an alkali metal reagent is used. The resulting reaction mixture is worked up according to known methods; thus, a complex resulting from the reaction of a ketone with Grignard reagent may be broken, for example, by adding a weak acid, such as an aqueous solution of ammonium chloride and the like, to the reaction mixture, and the desired product may then be isolated according to standard procedures.

Conversion of a hydroxyl group in a resulting starting material into an organic acyloxy group may be carried out according to known methods, for example, by controlled treatment with an acid anhydride, e.g. acetic acid anhydride, propionic acid anhydride and the like.

In view of the fact, that the Grignard product may be decomposed by treatment with an acidic reagent, e.g. ammonium chloride and the like, the desired starting material having one of the formulae

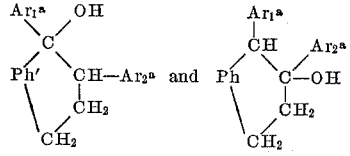

may not have to be isolated, but is directly converted into the desired product of the formula

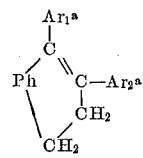

in which Ph, $Ar_1^a$ and $Ar_2^a$ have the previously-given meaning, and, if desired, in a resulting compound having a group $R_0^a$ capable of being converted, such group is converted into a hydroxyl group.

The intermediates used in the above preparation of the starting material may be prepared according to known methods; for example, an alkali metal salt of a compound of the formula $R_0'-CH_2-Ar_2^a$, in which $Ar_2^a$ has the previously given meaning, and $R_0'$ represents functionally converted carboxyl, is reacted with a reactive ester compound of the formula H-Ph-CH$_2$-CH$_2$-X, in which Ph and the group of the formula —(C$_n$H$_{2n}$)— have the previously-given meaning, and X is reactive esterified hydroxyl, particularly halogeno, if necessary, functionally converted carboxyl in a resulting compound is converted into free carboxyl or into another functionally converted carboxyl group, and a resulting compound of the formula

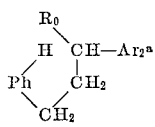

in which Ph and $Ar_2^a$ have the previously-given meaning, and $R_0$ stands for carboxyl or functionally converted carboxyl, is treated with a strong Lewis acid ring closing reagent to form the desired intermediate.

The steps of the above procedure are carried out according to known methods. A functionally converted carboxyl group, as represented by $R_0'$, is primarily cyano; the salt of a functional derivative of a compound of the formula $R_0'$–$CH_2$–$Ar_2^a$ is particularly an alkali metal salt of a compound having the formula

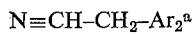

in which $Ar_2^a$ has the previously-given meaning. An alkali metal, e.g. lithium, sodium, potassium and the like, salt may be prepared, for example, by treatment of the compound of the formula $R_0'$–$CH_2$–$Ar_2^a$ with an alkali metal, e.g. sodium and the like, an alkali metal hydroxide, hydride or amine, e.g. lithium, sodium or potassium hydroxide, hydride or amide, an alkali metal lower alkoxide, e.g. sodium or potassium methoxide, ethoxide, n-butoxide, tertiary butoxide and the like, or any other suitable reagent, using appropriate inert solvents as diluents.

The group X of the second reagent is primarily hydroxyl esterified with a strong inorganic acid, particularly a mineral acid, e.g. hydrochloric, hydrobromic, hydriodic, sulfuric acid and the like, or a strong organic sulfonic acid, e.g. p-toluene sulfonic acid. Such group, is, therefore, above all halogeno, e.g. chloro, bromo, iodod and the like, as well as any other analogous, reactive esterified hydroxyl group. These compounds may be prepared, for example, by treating the corresponding alcohols with an appropriate reagent capable of converting hydroxyl into esterified hydroxyl, particularly halogeno, for example, by treatment with a thionyl halide, e.g. thionyl chloride and the like, a phosphorus halide, e.g. phosphorus tribromide and the like, or any other suitable reagent.

The reaction of the salt of a compound of the formula $R_0'$–$CH_2$–$Ar_2'$ with the reactive ester compound of the formula H–Ph–$CH_2$–$CH_2$–X is carried out according to known methods, preferably in the presence of a suitable diluent, and, if necessary, while cooling or heating, and/or in the atmosphere of an inert gas, e.g. nitrogen.

A functionally converted carboxyl group representing $R_0'$ in a resulting compound is converted into free carboxyl or into another functionally converted carboxyl group (representing $R_0$ in the above formula), according to known methods. For example, cyano may be converted into carbamyl or carboxyl by hydrolysis, such as treatment with an aqueous solution of an alkali metal hydroxide, e.g. sodium hydroxide and the like. The group $R_0$ is preferably free carboxyl, but may also stand for functionally converted carboxyl, such as carbamyl, as well as carbo-lower alkoxy, e.g. carbomethoxy, carbethoxy and the like, halogeno-carbonyl, e.g. chlorocarbonyl and the like.

The ring closure to the desired intermediate compounds is effected, for example, by treatment with a strong Lewis acid ring-closing reagent, for example, polyphosphoric acid, stannic chloride, aluminum chloride, sulfuric acid, hydrochloric acid, boron trifluoride and the like. If necessary, the mixture of the intermediate compound and the ring-closing reagent is diluted with an appropriate solvent or solvent mixture, the selection of which depends largely on the solubility of the starting material and the nature of the ring-closing reagent; preferred solvents are, for example, benzene, toluene, hexane, carbon disulfide, diethyl ether and the like. The reaction is preferably carried out at an elevated temperature, if necessary, in a closed vessel, and/or in the atmosphere of an inert gas, e.g. nitrogen.

A substituent may be introduced into the 1,2-phenylene portion of a resulting compound; thus, upon nitration with a suitable nitrating reagent a nitro group can be introduced into the aromatic portion. Furthermore, substituents attached to the 1,2-phenylene portion of the resulting compounds may be converted into other substituents. For example, a nitro group is reduced to amino according to known reduction methods, for example, by controlled treatment with hydrogen in the presence of a suitable catalyst, e.g. palladium on charcoal and the like, and of an inert solvent or solvent mixture, e.g. p-dioxane and the like, or converted into N,N-di-lower alkyl-amino, particularly N,N-dimethylamino, if the reduction is carried out in the presence of a lower alkanal, particularly formaldehyde. An amino group may be converted into halogeno by diazotization, followed by treatment with a cuprous halide according to the Sandmeyer reaction. Or, lower alkoxy, e.g. methoxy and the like, group may be converted into a free hydroxyl group by acidic hydrolysis, for example, by treatment with hydrobromic acid in the presence of acetic acid and the like.

A compound capable of forming a salt may be isolated in the form of a salt, which may be converted into the free compound. Thus, a metal salt, such as an alkali metal, e.g. sodium and the like, salt of a resulting compound having metal salt-forming properties may be treated with an acidic reagent, e.g. hydrochloric, sulfuric acid and the like, and converted into the free compound. Or, the resulting acid addition salt of a compound having acid addition salt-forming properties may be converted into the free compound, by treatment with a base, such as, for example, an alkali metal hydroxide or alkaline earth metal hydroxide, e.g. lithium hydroxide, sodium hydroxide, potassium hydroxide, calcium hydroxide and the like, an alkali metal carbonate or an alkaline earth metal carbonate, e.g. lithium, sodium, potassium or calcium carbonate or hydrogen carbonate and the like, ammonia or any other suitable base, or with a hydroxyl ion exchange preparation and the like.

A resulting compound capable of forming a salt may be so converted. Thus, the solution of a compound having metal, particularly alkali metal, salt-forming properties, may be treated with a metal, particularly an alkali metal, hydride, amide, lower alkoxide or hydroxide, preferably in stoichiometric amounts, and the diluent may be evaporated to yield the desired salt. Or, a compound having acid addition salt-forming properties, may be treated with an acid, such as one of those mentioned before, for example, by reacting a solution of the base in a suitable solvent or solvent mixture with the acid or a solution thereof, or with an anion exchange preparation, and the desired salt may be isolated.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

EXAMPLE 1

To a mixture of 2.4 g. of magnesium turnings in 50 ml. of diethyl ether are added a few drops of methyl iodide to initiate the formation of the Grignard reagent and then a solution of 19.0 g. of 4-bromo-anisole in 50 ml. of diethyl ether. The Grignard mixture is refluxed for two hours; while cooling with ice, a solution of 6.7 g. of 2- phenyl-1,2,3,4-tetrahydro-naphthalen-1-one in 50 ml. of diethyl ether is added dropwise. After the addition is completed, refluxing is continued for another three hours and the reaction mixture is allowed to stand for 15 hours. It is then cooled with ice; the Grignard complex of 1-(4-methoxy - phenyl) - 2 - phenyl - 1,2,3,4 - tetrahydro-naphthalen-1-ol is broken and simultaneously dehydrated by adding 25 ml. of a saturated aqueous solution of ammonium chloride. The reaction mixture is poured into 200 ml. of water; the organic solution is separated, the aqueous layer is extracted twice with diethyl ether, and the organic extracts are combined, washed with water, dried over sodium sulfate and evaporated. The desired 4 - (4 - methoxy - phenyl) - 3 - phenyl - 1,2 - dihydro-naphthalene of the formula

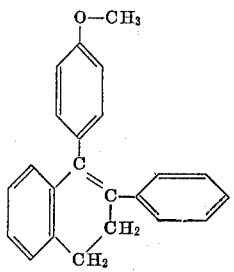

is obtained, which melts at 129–130° after recrystallization from a mixture of benzene and n-pentane.

EXAMPLE 2

A mixture of 40 g. of pyridine and 50 ml. of concentrated hydrochloric acid is slowly heated to 220° while distilling off the water; while maintaining that temperature, 5.0 g. of 4-(4-methoxy-phenyl)-3-phenyl-1,2-dihydro-naphthalene is added, and the reaction mixture is refluxed for thirty minutes. After cooling to room temperature, it is poured into 200 ml. of cold water, and the desired 4 - (4 - hydroxy - phenyl) - 3 - phenyl - 1,2 - dihydro-naphthalene of the formula

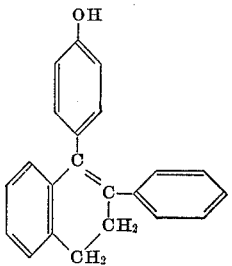

precipitates and melts at 124–125° after recrystallization from a mixture of benzene and n-pentane.

The above compound can be used as the starting material for the preparation of the 4-[4-(2-N,N-diethylaminoethyl) - oxy - phenyl] - 3 - phenyl - 1,2 - dihydro-naphthalene hydrochloride, which is prepared as follows: To a suspension of 3.7 g. of 4-(4-hydroxyphenyl)-3-phenyl-1,2-dihydro-naphthalene in 25 ml. of anhydrous ethanol is added 0.74 g. of sodium methoxide. The reaction mixture is stirred for one-half hour at room temperature, then treated with 6.2 ml. of a toluene solution of 2-N,N-diethylaminoethyl chloride (containing 0.224 g. of the base per ml.) and refluxed for 3½ hours. After cooling and filtering, the filtrate is evaporated to dryness, the oily product is dissolved in a mixture of benzene and pentane, and the solution is filtered and treated with hydrogene chloride gas while cooling with ice. The solvent is decanted, the residue is dissolved in acetone, the solution is diluted with ten times the volume of n-pentane and then allowed to stand, whereupon the 4-[4-(2-N,N-diethylaminoethyl) - oxy - phenyl] - 3 - phenyl - 1,2 - dihydro-naphthalene hydrochloride crystallizes and is recrystallized from a mixture of methanol and diethyl ether, M.P. 184–186°; yield: 3.0 g.

EXAMPLE 3

To a solution of 30.0 g. of 4-bromo-anisole in 75 ml. of diethyl ether is added 3.84 g. of magnesium in 75 ml. of diethyl ether; the reaction is initiated with a small amount of methyl iodide. The mixture is refluxed for one hour, cooled in an ice-bath and treated with 20.2 g. of 2 - (4 - methoxy - phenyl) - 1,2,3,4 - tetrahydro - naphthalen-1-one in 150 ml. of benzene. After refluxing for seven hours, it is poured into a saturated aqueous solution of ammonium chloride to decompose the Grignard complex of 1,2-bis-(4-methoxy-phenyl)-1,2,3,4-tetrahydro-naphthalene-1-ol and simultaneously dehydrate the latter. The aqueous solution is extracted three times with diethyl ether, the organic solution is dried over sodium sulfate, and the orange oil remaining after evaporating the solvent is taken up in 100 ml. of concentrated hydrochloric acid; the mixture is refluxed for thirty minutes and diluted with water. The precipitate is collected and yields the 3,4-bis-(4-methoxy-phenyl)-1,2-dihydro-naphthalene of the formula

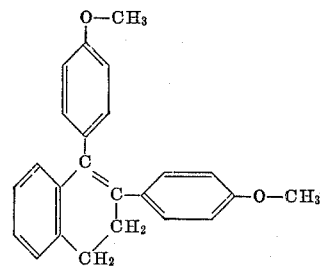

which melts at 167–168° after recrystallization from ethanol; yield: 18.4 g.

EXAMPLE 4

A solution of 60 m. of pyridine in 75 ml. of concentrated hydrochloric acid is distilled until the vapors reach a temperature of over 200° (bath temperature: 260°). A total of 5.0 g. of 3,4-bis-(4-methoxy-phenyl)-1,2-dihydro-naphthalene is added to the melt of pyridine hydrochloride, and the mixture is refluxed for one hour (bath temperature: about 250°). After cooling, water is added, the organic material is extracted with ethyl acetate, and the organic extracts are washed with a saturated aqueous solution of sodium chloride and dried over sodium sulfate. The solvent is then evaporated, and the remaining solid 3,4 - bis - (4-hydroxy-phenyl)-1,2-dihydro-naphthalene of the formula

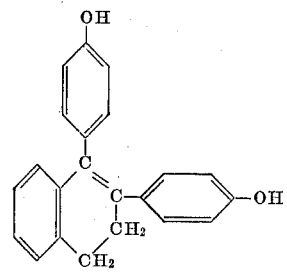

is recrystallized from a mixture of ethyl acetate and pentane, M.P. 255–258°.

The above compound can be used as intermediates in the preparation of 3,4-bis-[4-(2-N,N-diethylaminoethyl)-oxy-phenyl]-1,2-dihydro-naphthalene, which is prepared as follows: To a solution of 2.7 g. of 3,4-bis-(4-hydroxyphenyl)-1,2-dihydro-naphthalene in 10 ml. of N,N-dimethylformamide is added in portions 0.825 g. of a 53 percent suspension of sodium hydride while stirring and cooling in an ice bath. After the evolution of hydrogen ceases, 10.4 ml. of a toluene solution containing 2.33 g. of 2-N,N-diethylaminoethyl chloride is added dropwise; stirring is continued for three hours at room temperature. After standing overnight, the solid material is filtered off, the filtrate is evaporated to a small volume and diluted with water. The oily mixture is extracted three times with diethyl ether; the organic solution is washed with 2N aqueous hydrochloric acid, and the aqueous washings are made basic (pH=8) with solid sodium carbonate. The organic material is extracted with diethyl ether, and the organic solution is dried over sodium sulfate and evaporated to yield 2.8 g. of a red oil which is chromatographed on 90.0 g. of aluminum oxide (neutral) containing 5 percent of water. A solution of the red oil in a 1:1-mixture of benzene and hexane is placed on the column, which is developed as follows, taking 25 ml. fractions:

| Solvent | Amount (ml.) | Fractions |
| --- | --- | --- |
| 1:1-mixture of benzene and hexane | 275 | 1–11 |
| Benzene | 200 | 12–19 |
| Benzene containing 20 percent of diethyl ether | 225 | 20–28 |
| Benzene containing 50 percent of diethyl ether | 150 | 29–34 |
| Diethyl ether | 75 | 35–37 |
| Ethyl acetate | 25 | 38 |

Fractions 15–22 are combined and yield 1.8 g. of the oily 3,4-bis[4-(2-N,N-diethylaminoethyl)-oxy-phenyl]-1,2-dihydronaphthalene.

EXAMPLE 5

A mixture of 5.0 g. of 1-hydroxy-1-(4-methoxy-phenyl)-2-(3-pyridyl)-1,2,3,4-tetrahydro-naphthalene in 50 ml. of concentrated hydrochloric acid is refluxed for one hour and is then made alkaline to pH=8 by adding a 40 percent aqueous solution of sodium hydroxide. The organic material is extracted twice with ethyl acetate. The combined extracts are washed with a saturated aqueous solution of sodium chloride, dried over sodium sulfate and evaporated to dryness to yield 4.5 g. of 4-(methoxy-phenyl)-3-(3-pyridyl)-1,2-dihydro-naphthalene of the formula

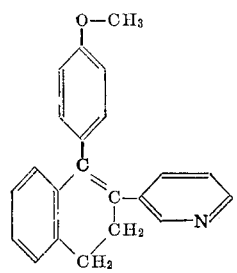

which melts at 130–131° after recrystallization from a 1:1-mixture of ethanol and water.

The starting material used in the above reaction may be prepared as follows: To an ice-bath cooled solution of 25.7 g. (0.218 mol) of 3-pyridyl-acetonitrile in 150 ml. of N,N-dimethylformamide is added in small portions 10.49 g. of a 53 percent suspension of sodium hydride in mineral oil (0.218 mol) while stirring. The reaction mixture is agitated at room temperature until the hydrogen evolution ceases and is then again cooled in an ice-bath. A solution of 40.2 g. (0.218 mol) of 2-bromoethyl-benzene in 150 ml. of toluene is added in a slow stream; the resulting mixture is stirred for three hours at room temperature and is then allowed to stand overnight at room temperature. The inorganic material (sodium bromide) is filtered off, the filtrate is evaporated to a total volume of 100 ml. and diluted with water. The organic material is extracted with three portions of diethyl ether, the organic solutions are washed with a saturated aqueous sodium chloride solution, dried over sodium sulfate, filtered and evaporated to dryness. The residue is distilled to yield 30.8 g. of a yellow oil representing 4-phenyl-2-(3-pyridyl)-butyronitrile, B.P. 143–150°/0.01 mm.

To a solution of 15.0 g. of 4-phenyl-2-(3-pyridyl)-butyro-nitrile in 60 ml. of ethanol (95 percent strength) is added a solution of 30 g. of sodium hydroxide in 30 ml. of water, and the mixture is refluxed for 64 hours. The organic solvent is evaporated under reduced pressure, more water is added and the pH is adjusted to 5 with 2 N aqueous hydrochloric acid and aqueous acetic acid. The mixture is extracted three times with diethyl ether; the organic extracts are washed with a saturated aqueous sodium chloride solution, dried over sodium sulfate and evaporated to dryness. The acetic acid remaining in the residue is driven off by blowing air over the surface of the oily product. 14.0 g. of 4-phenyl-2-(3-pyridyl)-butyric acid is recovered; the product melts at 106–108° and is recrystallized from a mixture of ethanol and water, M.P. 110–112.5°.

Into 55 g. of polyphosphoric acid, preheated to 90°, is stirred a total of 11 g. of 4-phenyl-2-(3-pyridyl)-butyric acid. The temperature is then elevated to 105–110° and maintained at that level for 25 minutes. The resulting clear solution is stirred into ice-water, the mixture is neutralized with a 50 percent aqueous solution of sodium hydroxide while keeping the temperature below 40°. The pH is adjusted to 8 by adding sodium carbonate, and the resulting crystalline precipitate is filtered off and taken up in diethyl ether. The organic solution is washed with water and a saturated aqueous sodium chloride solution, dried over sodium sulfate, filtered and evaporated to dryness to yield 9.3 g. of the colorless crystalline 2-(3-pyridyl)-1,2,3,4-tetrahydronaphthalen-1-one. The compound is purified by recyrstallization from a mixture of ethanol and water, M.P. 79–80°; the infrared absorption spectrum shows the characteristic conjugated carbonyl band at 1688 cm.$^{-1}$.

To a Grignard reagent prepared from 2.43 g. of magnesium and 18.7 g. of 4-bromo-anisole in 50 ml. of diethyl ether is added dropwise a solution of 15.0 g. of 2-(3-pyridyl)-1,2,3,4-tetrahydronaphthalene-1-one in 50 ml. of benzene. The reaction mixture is refluxed for one hour, is allowed to stand at room temperature for eighteen hours, and is again refluxed for one additional hour. The reaction mixture is cooled, water is added dropwise and then a saturated aqueous solution of ammonium chloride while stirring. The crystalline precipitate floating between the organic and aqueous layers is collected and recrystallized from 95 percent ethanol to yield 5.0 g. of the 1-hydroxy-1-(methoxy-phenyl)-2-(3-pyridyl)1,2,3,4-tetrahydro-naphthalene, M.P. 198–199°.

EXAMPLE 6

A mixture of 4.4 g. of 4-(4-methoxy-phenyl)-3-(3-pyridyl)3,4-dihydro-naphthalene in pyridine hydrochloride (prepared from 50.0 g. of pyridine and 60 ml. of concentrated hydrochloric acid) is refluxed for thirty minutes (bath temperature: 250°). After cooling, the mixture is diluted with water, and the pH is adjusted to 5 with sodium hydrogen carbonate and sodium acetate. The desired 4-(4-hydroxy-phenyl)-3-(3-pyridyl)-1,2-dihydro-naphthalene of the formula

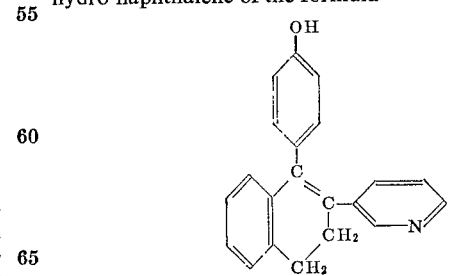

precipitates, is collected, washed, air-dried and recrystallized from a mixture of N,N-dimethylformamide and water, M.P. 300–302°.

This compound can be used as an intermediate for the preparation of 4-[4-(2-N,N-diethylaminoethyl)-oxyphenyl]-3-(3-pyridyl)-1,2-dihydro-naphthalene, which is prepared as follows: To a solution of 3.36 g. of 4-(4-hydroxy-phenyl)-3-(3-pyridyl)-1,2-dihydro-naphthalene in 25 ml. of N,N-dimethylformamide is added 0.56 g.

of a 53 percent sodium hydride suspension in mineral oil at room temperature, and subsequently 1.51 g. of 2-N,N-diethylaminoethyl chloride in 8 ml. of toluene while stirring. The reaction mixture is allowed to stand at room temperature for fifteen hours, the inorganic precipitate is filtered off, and the filtrate is concentrated to a volume of about 10 ml. under reduced pressure. After dilution with water, the organic material is extracted with ethyl acetate; the organic extract is washed twice with 2 N aqueous hydrochloric acid, the acid extracts are adjusted to pH 7 with 40 percent aqueous sodium hydroxide and an aqueous solution of sodium hydrogen carbonate, and the organic material is extracted five times with a 5:1-mixture of diethyl ether and ethyl acetate. The organic solution is washed with a saturated aqueous solution of sodium chloride, dried over sodium sulfate and evaporated to yield 4.2 g. of the oily 4-[4-(2-N,N-diethylaminoethyl)-oxyphenyl]-3-(pyridyl)-1,2 - dihydro-naphthalene, which is purified by distillation, B.P. 195–200°/0.05 mm.

EXAMPLE 7

To a Grignard reagent (prepared from 7.8 g. of bromobenzene and 1.2 of magnesium filings in 50 ml. of diethyl ether) is added dropwise 7.0 g. of 2-(4-methoxyphenyl)-1,2,3,4-tetrahydro-naphthalene-1-one in 40 ml. of benzene; the reaction mixture is refluxed for one hour, and is then allowed to stand at room temperature for 18 hours, and again refluxed for five additional hours. The Grignard complex of 2-(4 - methoxy-phenyl)-1-phenyl-1,2,3,4 - tetrahydro-naphthalene-1-ol is decomposed, and the alcohol compound dehydrated by adding 50 ml. of concentrated an aqueous ammonium chloride. The organic material is extracted three times with ethyl acetate; the organic solution is washed with a saturated aqueous sodium chloride solution and then evaporated to yield the crude 3 - (4 - methoxy-phenyl) - 4 - phenyl-1,2-dihydro-naphthalene of the formula

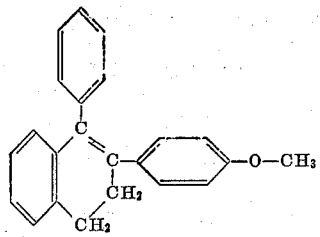

It is purified by distillation; the fraction at 170–195°/0.1 mm. is collected, and the light yellow oil is crystallized from the methanol and recrystallized from a mixture of benzene and pentane, M.P. 149–150°.

EXAMPLE 8

A mixture of 4.0 g. of 3-(4-methoxy-phenyl)-4-phenyl-1,2-dihydro-naphthalene in pyridines hydrochloride (prepared by removing the water and the excess of hydrogen chloride from a solution of 40 ml. of pyridine in 48 ml. of concentrated aqueous hydrochloric acid) is refluxed for one hour (bath temperature: 250°). The cooled reaction mass is diluted with water, the solvent is decanted and the residue is taken up in benzene. The organic solution is separated, washed twice with water, dried over sodium sulfate and evaporated to yield the 3-(4-hydroxyphenyl)-4-phenyl-1,2-dihydro-naphthalene of the formula

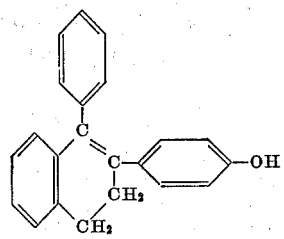

which crystallizes after adding pentane, M.P. 133–314°.

EXAMPLE 9

To a Grignard reagent prepared from 28.0 g. of 4-bromo-anisole and 3.6 g. of magnesium turnings in 150 ml. of diethyl ether is added dropwise 20.0 g. of 2-(4-chloro-phenyl)-1,2,3,4-tetrahydro-naphthalen-1-one in 150 ml. of benzene while stirring and cooling in an ice-bath. After refluxing for five hours, standing for eighteen hours, and again refluxing for two hours, the reaction mixture, containing the 2-(4-chloro-phenyl)-1-(4-methoxy-phenyl) 1,2,3,4-tetrahydro-naphthalen-1-ol, is decomposed with an aqueous solution of ammonium chloride. The organic material is extracted with three portions of ethyl acetate; the organic solution is washed with a saturated solution of sodium chloride in water, dried over sodium sulfate and evaporated under reduced pressure to yield a viscous oil, which fails to crystallize readily. It is dissolved in 200 ml. of ethanol saturated with hydrogen chloride, and the solution is refluxed for one hour and evaporated under reduced pressure. The resulting 3-(4-chloro-phenyl)-4-(4-methoxy-phenyl)-1,2-dihydro-naphthalene of the formula

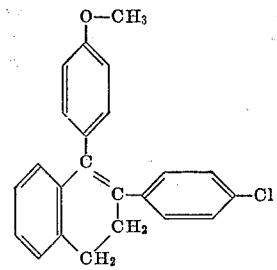

crystalizes from ethanol (yield: 161–164°), and is recrystallized from a mixture of benzene and pentane.

The starting material used in the above procedure is prepared as follows: To a solution of 167 g. of 4-chlorophenyl-actonitrile in 1000 ml. of a 1:1-mixture of N,N-dimethylformamide and toluene is added in portions 48 g. of a 53 percent suspension of sodium hydride in mineral oil while stirring and cooling in an ice-bath. After the evolution of hydrogen ceases, a solution of 185 g. of 2-phenylethyl bromide in 200 ml. of toluene is added dropwise; the reaction mixture is stirred at room temperature for five hours and allowed to stand for twenty hours. The solvents are removed under reduced pressure; the oily residue is treated with water and the organic material is extracted with diethylether. The organic solution is washed with acetic acid and a saturated solution of sodium chloride in water, dried over sodium sulfate and evaporated to dryness. The resulting 2-(4-chlorophenyl)-4-phenyl-butyronitrile is purified by distillation and collected at 202°/0.1 mm.; yield: 183 g.

A solution of 183 g. of 2-(4-chloro-phenyl)-4-phenyl-butyronitrile in 720 ml. of 95 percent ethanol is added to 360 g. of sodium hydroxide in 360 ml. of water, and the mixture is heated under reflux for three days. The major portion of the ethanol is distilled off under reduced pressure, and the aqueous portion is made acidic with dilute hydrochloric acid while cooling in an ice-bath. The resulting precipitate is extracted with two portions of diethyl ether and one portion of ethyl acetate; the organic solutions are cleared by filtration through a wet layer of a diatomaceous earth preparation, combined and washed with a saturated aqueous solution of sodium chloride, dried over sodium sulfate and evaporated to dryness. The remaining viscous oil crystallizes from a mixture of hexane and pentane to yield 152 g. of 2-(4-chloro-phenyl) 4-phenyl-butyric acid, M.P. 82–84°.

To a solution of 153 g. of 2-(4-chloro-pheny)-4-phenyl-butyric acid in 500 ml. of diethyl ether is added 25 drops of pyridine and dropwise 50 ml. of thionyl chloride while stirring and cooling in an ice-bath. The reaction mixture is then refluxed for thirty minutes, and the diethyl ether is stripped off. The residue is diluted with 50 ml. of benzene and the solvent is evaporated under reduced pressure; this procedure to remove the unreacted thionyl chloride is repeated three times.

The residue is then taken up into 500 ml. of benzene and, while stirring and cooling in an ice-bath, the solution is treated dropwise with a mixture of 75 ml. of stannic chloride in 100 ml. of benzene. The reaction mixture is then allowed to warm to room temperature and is stirred for one hour; after cooling, it is treated dropwise with 500 ml. of 2 N hydrochloric acid while stirring. The organic layer is separated and the aqueous phase is extracted twice with ethyl acetate; the organic solutions are combined, washed five times with an aqueous solution of sodium carbonate, and with an aqueous solution of sodium chloride, dried over sodium sulfate and evaporated to dryness. The resulting 2-(4-chloro-phenyl)-1,2,3,4-tetra-hydro-naphthalen-1-one is recrystallized from a mixture of benzene and petroleum ether, M.P. 108–109°; yield: 110 g.

EXAMPLE 10

To anhydrous pyridine hydrochloride, prepared by distilling a mixture of 94 g. of pyridine and 113 ml. of concentrated hydrochloric acid until the vapor phase reached the temperature of 216°, is added 13.2 g. of 3-(4-chloro-phenyl)-4-(4-methoxy-phenyl)-1,2-dihydro - naphthalene. The clear reaction mixture is gently refluxed for thirty minutes (bath temperature: 245–250°) and is then poured onto ice. The liquid phase is decanted from the solid gummy material, which is dissolved in 100 ml. benzene, washed with water and a saturated aqueous solution of sodium chloride, dried over sodium sulfate and concentrated to a volume of 25 ml. Hexane is added and the desired 3-(4-chloro-phenyl)-4-(4-hydroxy-phenyl)-1,2-dihydro-naphthalene of the formula

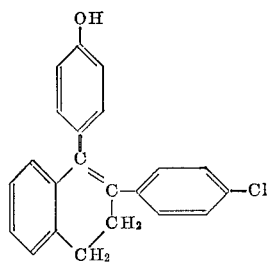

crystallizes at room temperature; yield: 7.7 g. It melts at 144–146° after recrystallization from a mixture of benzene and pentane.

EXAMPLE 11

A mixture of 1.0 g. of 1-(4-methoxy-phenyl)-2-(3-pyridyl)-1,2,3,4-tetrahydro-naphthalen-1-ol in 10 ml. of pyridine and 10 ml. of acetic anhydride is refluxed for five hours. The 1-acetyloxy-1-(4-methoxy-phenyl)-2-(3-pyridyl)-1,2,3,4-tetrahydronaphthalene formed during the reaction is converted directly into the desired 4-(4-methoxy-phenyl)-3-(3-pyridyl)-1,2-dihydro-naththalene which is isolated as follows: The reaction mixture is evaporated under reduced pressure, and the dark residue is diluted with 10 ml. of water and 10 ml. of a saturated aqueous solution of sodium hydrogen carbonate. The organic material is extracted with three portions of ethyl acetate; the combined organic solutions are washed with a saturated aqueous solution of sodium chloride, dried over sodium sulfate and evaporated to dryness. The desired 4-(4-methoxy-phenyl)-3-(3-pyridyl) - 1,2 - dihydro-naphthalene melts at 132–134° after recrystallization from a mixture of ethanol and water.

EXAMPLE 12

To a solution of 2.0 g. of 4-(4-hydroxy-phenyl)-3-phenyl - 1,2 - dihydro - naphthalene in 20 ml. of N,N-dimethylformamide is added 0.32 g. of a 53 percent suspension of sodium hydride in mineral oil. After the hydrogen evolution ceases, a solution of 1.05 g. of methyl iodide in 10 ml. of toluene is added while stirring and cooling in an ice-bath. After stirring for four hours and standing for fifteen hours at room temperature, the reaction mixture is filtered; the solid residue is washed with benzene and diethyl ether, and the combined organic solutions are evaporated to dryness under reduced pressure. Water is added to the residue, and the resulting precipitate is filtered off and recrystallized from 95 percent ethanol to yield 1.5 g. of the desired 4-(4-methoxy-phenyl)-3-phenyl-1,2-dihydro-naphthalene, M.P. 130–132°.

EXAMPLE 13

The following compounds are prepared according to the above described and illustrated procedure by selecting the appropriate starting materials:

4-(4-hydroxy-phenyl)-3-(4-pyridyl)-1,2-dihydro - naphthalene, prepared by reacting 2-(4-pyridyl)-1,2,3,4-tetrahydro-naphthalen-1-one with the Grignard reagent from 4-bromo-anisole and magnesium, and treating the resulting 4-(4 - methoxy - phenyl)-3-(4 - pyridyl)-1,2-dihydro-naphthalene with pyridine hydrochloride;

4-(4-hydroxy - phenyl)-7-methyl-3-phenyl-1,2-dihydro-naphthalene, perpared by reacting 6-methyl-2-phenyl-1,2,3,4-tetrahydro-naphthalen - 1 - one with the Grignard reagent from 4-bromo-anisole and magnesium, and treating the resulting 4-(4 - methoxy - phenyl)-7-methyl-3-phenyl-1,2-dihydro-naphthalene with pyridine hydrochloride;

7-fluoro-3-(4 - hydroxy - phenyl)-4-phenyl-1,2-dihydro-naphthalene, prepared by reacting 2-(4-ethoxy-phenyl)-1,2,3,4-tetrahydro-naphthalen-1-one with the Grignard reagent from bromobenzene and magnesium, and treating the resulting 7 -fluoro-3-(4-ethoxy-phenyl)-4-phenyl-1,2-dihydro-naphthalene with pyridine hydrochloride;

4-(4-hydroxy-phenyl)-8-methoxy-3-phenyl-1,2-dihydro-naphthalene, prepared by reacting 5-methoxy-2-phenyl-1,2,3,4-tetrahydro-naphthalen-1-one with the Grignard reagent from 4-benzyloxy-bromobenzene and magnesium, and treating the resulting 4-(4-benzyloxy-phenyl)-8-methoxy-3-phenyl-1,2-dihydro-naphthalene with hydrogen in the presence of a palladium catalyst;

8-ethoxy-4-(4-isopropyloxy-phenyl)-3-phenyl - 1,2 - dihydro-naphthalene, prepared by reacting 5-ethoxy-2-phenyl-1,2,3,4-tetrahydronaphthalen-1-one with the Grignard reagent from 4-benzyloxy-bromobenzene and magnesium, treating the resulting 4-(4-benzyloxy-phenyl)-8-ethoxy-3-phenyl-3,4-dihydro-naphthalene with hydrogen in the presence of a palladium catalyst, and etherifying the resulting 8-ethoxy-4-(4-hydroxy-phenyl)-3-phenyl-1,2-dihydro-naphthalene by converting it into the sodium salt and reacting the latter with isopropyl bromide;

7-chloro-4-(4 - hydroxy - phenyl)-3-phenyl-1,2-dihydro-naphthalene, prepared by reacting 6-chloro-2-phenyl-1,2,3,4-tetrahydro-naphthalen-1-one with the Grignard reagent from 4-bromo-anisole and magnesium, and treating the resulting 7-chloro-4-(4-methoxy-phenyl)-3-phenyl-1,2-dihydro-naphthalene with pyridine hydrochloride;

6-chloro-3-(4-methoxy - phenyl)-4-phenyl-1,2-dihydro-naphthalene, prepared by reacting 7 - chloro - 3 - (4 - methoxy-phenyl)-1,2,3,4-tetrahydro-naphthalen - 1 - one with the Grignard reagent from bromobenzene and magnesium, and treating the resulting 6-chloro-3-(4-methoxy-phenyl)-4-phenyl-1,2-dihydro-naphthalene with pyridine hydrochloride;

4-(4-hydroxy-phenyl)-3-(4-methyl - phenyl) - 1,2 - dihydro-naphthalene, prepared by reacting 2-(4-methyl-phenyl)-1,2,3,4-tetrahydro-naphthalen - 1 - one with the Grignard reagent from 4-bromo-anisole and magnesium, and treating the resulting 4-(4-methoxy-phenyl)-3-(4-methyl-phenyl)-1,2-dihydro-naphthalene with pyridine hydrochloride, and the like.

What is claimed is:

1. A member selected from the group consisting of a compound having the formula

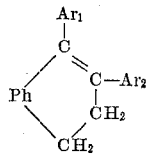

in which Ph is a 1,2-phenylene radical, one of the groups Ar₁ and Ar₂ stands for a member selected from the group consisting of (hydroxy)-phenyl and (lower alkoxy)-phenyl, and the other stands for a member selected from the group consisting of phenyl, (lower alkyl-phenyl, (hydroxy)-phenyl, (lower alkoxy)-phenyl, (halogeno)-phenyl and pyridyl, and an alkali metal, salt alkaline earth metal salt or a therapeutically acceptable acid addition salt thereof.

2. Compound of the formula

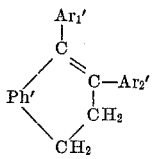

in which Ph′ is a member selected from the group consisting of 1,2-phenylene, (lower alkyl)-1,2-phenylene, (hydroxy)-1,2-phenylene, (lower alkoxy)-1,2-phenylene, (halogeno)-1,2-phenylene, (nitro)-1,2-phenylene, (amino)-1,2-phenylene, ((N,N-di-lower alkyl-amino)-1,2-phenylene and (trifluoromethyl)-1,2-phenylene, one of the groups Ar₁′ and Ar₂′ is a member of the group consisting of (hydroxy)-phenyl and (lower alkoxy)-phenyl, and the other is a member selected from the group consisting of phenyl, (lower alkyl)-phenyl, (hydroxy)-phenyl, (lower alkoxy)-phenyl, (halogeno)-phenyl and pyridyl.

3. 4 - (4 - methoxy - phenyl) - 3 - phenyl - 1,2 - dihydro-naphthalene.

4. 4 - (4 - hydroxy - penyl) - 3 - phenyl - 1,2 - diyhdro-naphthalene.

5. 3,4 - bis - (4 - methoxy - phenyl) - 1,2 - dihydro-naphthalene.

6. 3,4 - bis - (4 - hydroxy - phenyl) - 1,2 - dihydro-naphthalene.

7. 4 - (4 - methoxy - phenyl) - 3 - (3 - pyridyl) - 1,2-dihydro-naphthalene.

8. 4 - (4 - hydroxy - phenyl) - 3 - (3 - pyridyl) - 1,2-dihydro-naphthalene.

9. 3 - (4 - methoxy - phenyl) - 4 - phenyl - 1,2 - dihydro-naphthalene.

10. 3 - (4 - hydroxy - phenyl) - 4 - phenyl - 1,2 - dihydro-naphthalene.

11. 3 - (4 - chloro - phenyl) - 4 - (4 - methoxy - phenyl)-1,2-dihydro-naphthalene.

12. 3 - (4 - chloro - phenyl) - 4 - (4 - hydroxy - phenyl)-1,2-dihydro-naphthalene.

13. A compound having one of the formulae selected from the group consisting of

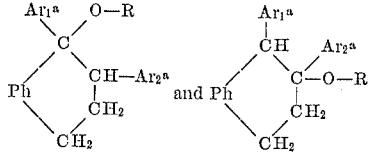

in which Ph is a 1,2-phenylene radical, one of the groups Ar₁ᵃ and Ar₂ᵃ stands for phenyl substituted by R₀ᵃ capable of being converted into hydroxyl, and the other stands for a member selected from the group consisting of phenyl substituted by R₀ᵃ, phenyl, (lower alkyl)-phenyl, (halogeno)-phenyl and pyridyl, and R is a member of the group consisting of hydrogen and the acyl radical of an organic acid.

14. A compound having one of the formulae

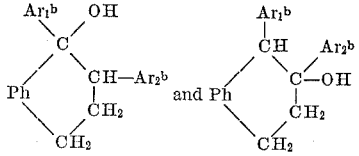

in which Ph′ is a member selected from the group consisting of 1,2-phenylene, (lower alkyl)-1,2-phenylene, (hydroxy)-1,2-phenylene, (lower alkoxy-1,2-phenylene, (halogeno)-1,2-phenylene, (nitro) - 1,2 - phenylene, (amino)1,2-phenylene, (N,N-di-lower alkyl-amino)-1,2-phenylene and (trifluoromethyl)-1,2-phenylene, one of the groups Ar₁ᵇ and Ar₂ᵇ is (lower alkoxy)-phenyl, and the other is a member selected from the group consisting of phenyl, (lower alkyl) - phenyl, (lower alkoxy) - phenyl, (halogeno)-phenyl and pyridyl.

15. 1 - (4 - methoxy - penyl) - 2 - (3 - pyridyl) - 1,2,3,4-tetra-hydro-naphthalen-1-ol.

References Cited
UNITED STATES PATENTS 3,277,112   10/1966   Bencze _____ 260—619
3,338,914   8/1967    Lednicer _____ 260—297

JOHN D. RANDOLPH, *Primary Examiner*

A. L. ROTMAN, *Assistant Examiner.*

U.S. Cl. X.R.

99—2; 167—65, 33, 74; 260—295.5, 247.7, 294.9, 515, 270, 295, 612, 619, 623, 465, 268, 239, 247.2, 247.5